Sept. 22, 1970  I. B. WEISE ET AL  3,529,622
BALANCED PRESSURE RESPONSIVE VALVE
Filed April 22, 1968  2 Sheets-Sheet 1

Irvin B. Weise
Jone Yen Ligh
INVENTORS

BY
ATTORNEYS

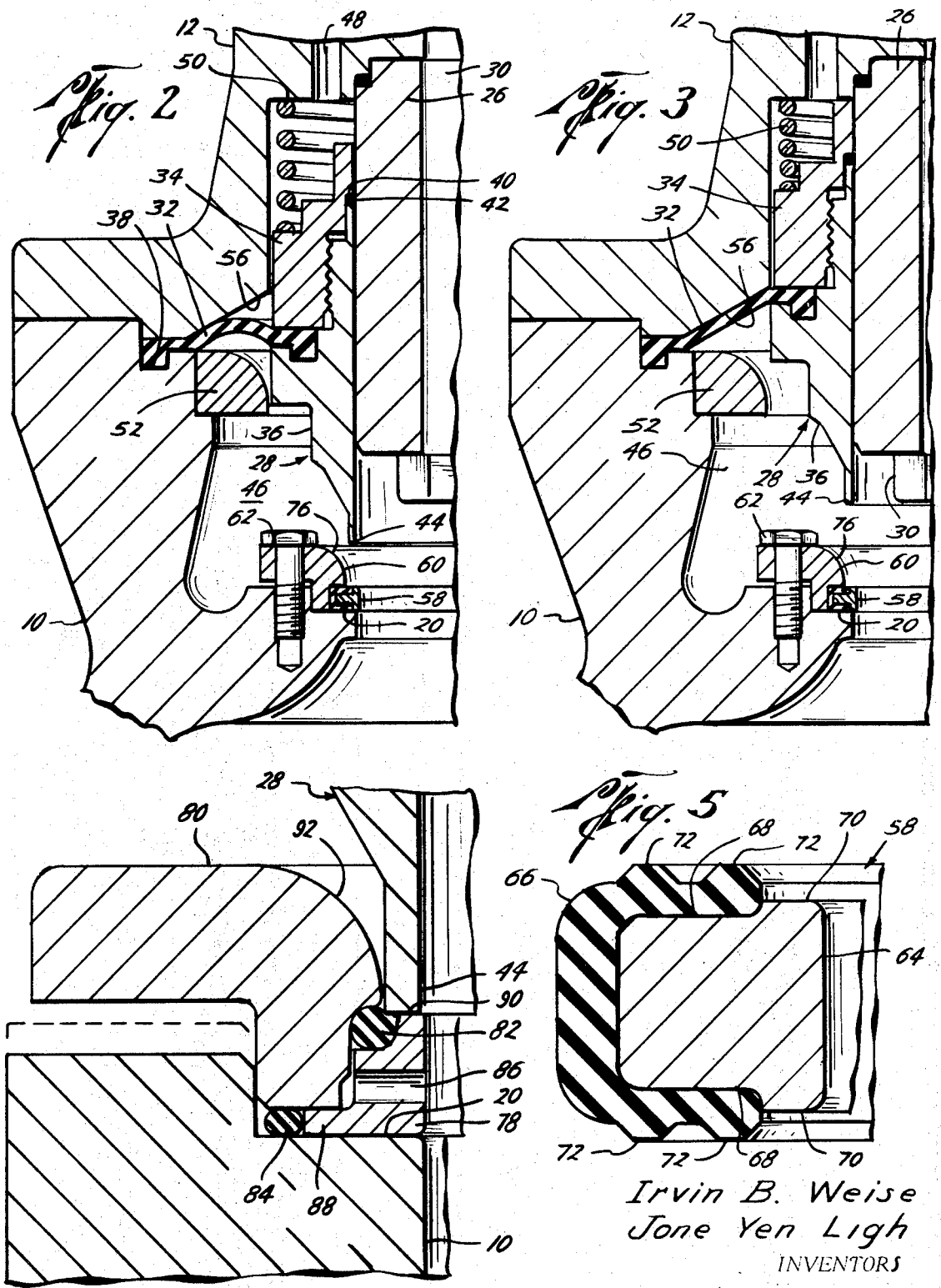

United States Patent Office 3,529,622
Patented Sept. 22, 1970

3,529,622
BALANCED PRESSURE RESPONSIVE VALVE
Irvin B. Weise, Bellaire, and Jone Yen Ligh, Houston, Tex., assignors to Anderson, Greenwood & Co., Houston, Tex., a corporation of Texas
Filed Apr. 22, 1968, Ser. No. 723,128
Int. Cl. F16k 17/02
U.S. Cl. 137—329.02      10 Claims

ABSTRACT OF THE DISCLOSURE

A diaphragm actuated valve in which the effective area of the diaphragm decreases as the valve opens, the diaphragm is completely supported in both full open and closed positions and the valve member is substantially balanced.

BACKGROUND OF THE INVENTION

Prior diaphragm actuated valves have been limited to the amount of pressure and pressure differential to which they may be safely exposed. Some valves have used grid plates to support the diaphragm but when the valve remains in position with the diaphragm supported on the grid for an extended period of time, the diaphragm tends to extrude into the slots in the grid. This condition can result in sticking of the valve and premature failure of the diaphragm.

It is also desirable in such diaphragm actuated valves to have a balanced valve member, to have a soft seat to assure tight shut-off while defining the flow opening between metal members, to provide some form of dampening against surges and to provide a change in the effective area of the diaphragm as the valve member moves.

SUMMARY

The present invention relates to an improved diaphragm actuated valve.

An object of the present invention is to provide an improved diaphragm-actuated valve having good stability of control over a wide range of flow and pressure.

Another object is to provide an improved diaphragm actuated valve having a soft seat and providing throttling flow passage between metal members.

Still another object is to provide an improved diaphragm actuated valve in which the diaphragm is supported in full open position.

A still further object is to provide an improved diaphragm actuated valve having dampening against surges in flow and pressure.

Another object is to provide an improved diaphragm actuated control valve in which the effective area of the diaphragm is decreased as the valve opens.

BRIEF DESCRIPTION OF THE DRAWINGS

These and other objects and advantages are hereinafter set forth and explained with reference to the embodiments illustrated in the drawings wherein:

FIG. 2 is a partial sectional view of the same valve in partly open position.

FIG. 3 is a similar partial sectional view of the same valve in full open position.

FIG. 5 is a partial sectional view of the seat ring shown in FIG. 4 before it is installed in the valve.

FIG. 6 is a partial sectional view of the valve of the present invention having a modified valve seat.

DESCRIPTION OF THE PREFERRED EMBODIMENTS

The improved diaphragm actuated valve of the present invention has an annular sleeve valve assembly supported for axial movement within the valve body and an annular diaphragm secured to the sleeve valve around its inner periphery and to the body around its outer periphery. The pressures on opposite sides of the diaphragm move the sleeve valve and during opening movement of the sleeve valve, increasing portions of the diaphragm are supported so that the effective area of the diaphragm is decreased and moved inwardly.

Figure 1:
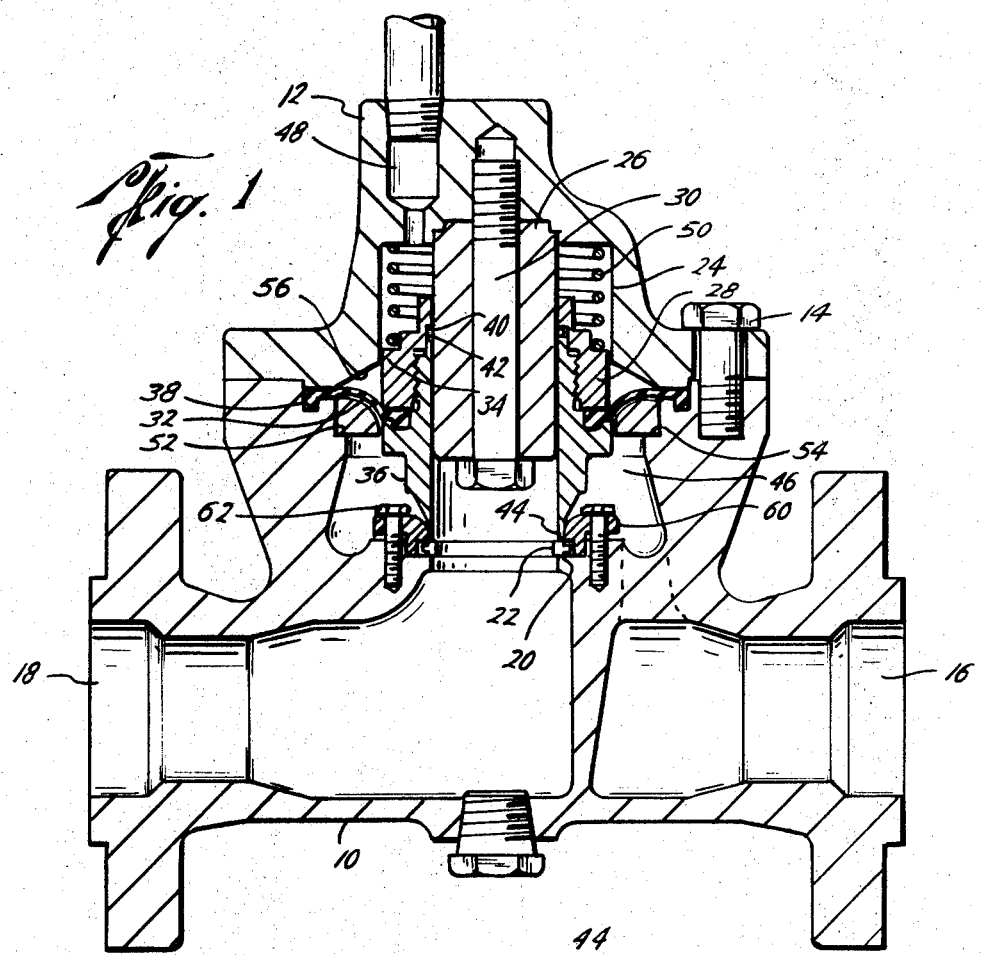
FIG. 1 is a sectional view of one form of the valve of the present invention showing the valve in closed position.

The embodiment of the valve of the present invention as shown in FIG. 1 includes the valve body 10 and the bonnet 12 which is secured to the body 10 by the bolts 14. The body 10 defines the inlet 16, the outlet 18 and the shoulder 20 surrounding communication between the inlet 16 and the outlet 18. The shoulder 20 is provided to receive and support the seat assembly 22 within the body 10.

The bonnet 12 defines the recess 24 with the piston 26 mounted centrally therein and the valve member or sleeve valve 28 is slidably mounted on the piston 26. As shown, piston 26 is secured within recess 24 by bolt 30. The inner periphery of diaphragm 32 is beaded and is clamped between two sleeves 34 and 36 which make up the sleeve valve 28. The outer periphery of diaphragm 32 is also beaded and is positioned in the recess 38 defined in body 10 and is retained in such position by bonnet 12. Thus, sleeve valve 28 is axially movable to and from engagement with the seat provided by seat assembly 22. The two sleeves 34 and 36, when threaded together, define the groove 40 in which suitable sealing means, such as O-ring 42, is positioned to provide a sliding seal between the interior of sleeve valve 28 and the exterior of piston 26. The inner diameter of sleeve valve 28 is substantially the same diameter as the inner diameter of seat assembly 22 so that sleeve valve 28 is balanced with respect to pressure differentials existing between inlet 16 and outlet 18. The exterior of sleeve valve 28 is spaced slightly from the walls of recess 24 to provide a restricted flow passage therebetween for the purposes as hereinafter set forth. The sleeve 36 defines an annular projection 44 which is adapted to engage the seating surfaces of seat assembly 22.

Body 10 and diaphragm 32 define the chamber 46 which is in communication with inlet 16 so that one side of diaphragm 32 is exposed to inlet pressure. The other side of diaphragm 32 is exposed to control pressure delivered to the recess 24 through the port 48. Also, means such as spring 50, is provided to urge sleeve valve 28 towards its seated position.

The diaphragm 32 which has a shallow annular convolution is fully supported throughout its unclamped area when sleeve valve 28 is in seated position and when sleeve valve 28 is in its fully open position. To provide the support for diaphragm 32 in the closed position of sleeve valve 28, the support ring 52 is positioned on shoulder 54 defined by body 10. To provide support for diaphragm 32 in the open position of sleeve valve 28, the annular supporting surface 56 is formed on the interior of bonnet 12 to have a taper extending from the inner periphery at which bonnet 12 clamps diaphragm 32 against body 10 inwardly and away from diaphragm 32 as shown in FIG. 1, terminating in the recess 24. While both supporting surfaces are shown, the support ring 52 may be omitted when the valve is to be placed in a service where the control pressure can never exceed the inlet pressure.

The relative positions of diaphragm 32 with respect to support ring 52 and supporting surface 56 are illustrated in FIGS. 1, 2 and 3. In FIG. 1 sleeve valve 28 is seated on the seat assembly 22 and the inlet pressure exerted on the body side of diaphragm 32 is greater than the pressure on the bonnet side a diaphragm 32. This pressure differential holds the diaphragm 32 slightly above the supporting surface on support ring 52. The force exerted by spring 50 holds sleeve valve 28 seated against this pressure differential. It should be noted, however, that if this pressure differential were reversed, the diaphragm 32 would be fully supported over its entire unclamped area except for the minor clearance area between the interior of support ring 52 and the exterior of sleeve 36.

FIG. 2 illustrates the sleeve valve 28 partially open and the diaphragm 32 has a portion of its outer area engaging and supported by supporting surface 56. Thus, as sleeve valve 28 moves open, the diaphragm 32 has a rolling motion so that the portion of the outer area of diaphragm 32 supported on supporting surface 56 increases to thereby decrease the effective area of the diaphragm 32 and move it inwardly. This change in effective area of the diaphragm 32 even when exposed to pressure differentials with good control stability over a wide range of flow rates and pressures.

In FIG. 3, sleeve valve 28 is shown in its fully opened position. In this position, the unclamped area of the diaphragm 32 is completely supported by the supporting surface 52 with the exception of the minor clearance area between the walls of recess 24 and the exterior of sleeve 34. This uniform supporting of diaphragm 32 in both extreme positions prevents damage to and sticking of the diaphragm 32 even when exposed to pressure differentials substantially above the pressure differentials which prior diaphragms could withstand.

The diaphragm 32 is preferred to be a flexible fabric reinforced rubber diaphragm which is annular in configuration and has a shallow convolution. Such diaphragm in its unsupported positions may be subjected to pressure differentials of as much as 100 to 150 p.s.i.g. Generally it is preferred that the valve be designed so that it begins to open at a differential in a range from three to five percent of inlet pressure and that it move to fully open position at a differential between ten and fifteen percent of the inlet pressure.

Figure 4:
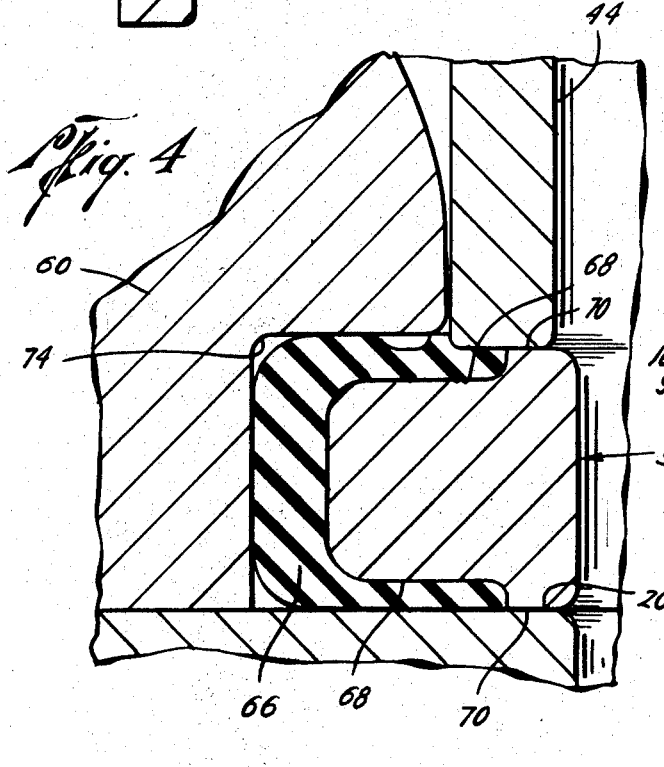
FIG. 4 is a partial detailed sectional view of the seat of the valve shown in FIGS. 1, 2 and 3.

The seat assembly 22 and its coaction with sleeve valve 28 is shown in FIGS. 4 and 5. The seat assembly 22 includes the seat ring 58 which is held on shoulder 20 by the nozzle ring 60. Bolts 62 secure nozzle ring 60 to the body 10. Seat ring 58 includes the metal ring 64 and the channel-shaped resilient ring 66 bonded to the recessed faces 68 and around the outer periphery of metal ring 64. As can be seen, the seat ring 58 is reversible, that is, it may be installed on shoulder 20 with either side abutting shoulder 20 since it is substantially symmetrical. The bore through ring 64 is substantially the same diameter as the bore of body 10 within shoulder 20. The surfaces 70 on ring 64 are adapted to provide a metal-to-metal seating with projection 44 and with shoulder 20 when sleeve valve 28 is tightly seated. The faces of resilient ring 66 define the annular ribs 72 projecting axially beyond surfaces 70 as best seen in FIG. 5. The nozzle ring 60 defines the recess 74 which engages resilient ring 66 when nozzle ring 60 is secured to body 10 by bolts 62 to clamp seat ring 58 in sealed position on shoulder 20. The ribs 72 are partially compressed by the clamping action of nozzle ring 60 to provide seals between seat ring 58 and shoulder 20 and between seat ring 58 and the clamping surface of recess 74 in nozzle ring 60.

The interior of nozzle ring 60 defines the surface 76 which coacts with the exterior of the projection 44 to provide the desired flow path having a preselected flow area for each position of the sleeve valve 28. Thus, while the seat assembly 22 provides a soft seat to assure tight shut-off, the flow area is defined between the two metal members, projection 44 and surface 76.

Figure 7:
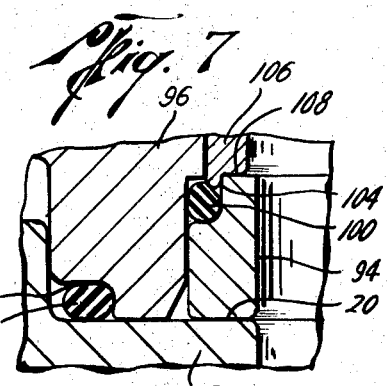
FIG. 7 is a partial sectional view of the valve of the present invention having a modified sleeve valve member and valve seat.

The modified seat assembly illustrated in FIG. 7 includes the seat ring 94, the nozzle ring 96 and the two O-rings 98 and 100. Nozzle ring 96 defines the recess 102 in which O-ring 98 is received. The recess 102 is shallower than the free sectional diameter of O-ring 98 so that when nozzle ring 96 is seated on shoulder 20, O-ring 98 seals between shoulder 20 and nozzle ring 96. Seat ring 94 is positioned on or close to shoulder 20 within nozzle ring 96. Seat ring 94 and nozzle ring 96 define the recess in which O-ring 100 is positioned. As shown in FIG. 7, the upper outer edge of seat ring 94 is spaced inwardly from the inner surface of nozzle ring 96 to allow the stepped projection 104 on sleeve 106 to pass therethrough on closing to initially engage O-ring 100 before it engages the upper seating surface 108 on seat ring 94.

In this structure, seat ring 94 floats within nozzle ring 96 when sleeve valve 106 is unseated. This floating action allows an equalization of pressure across O-ring 100 by providing a fluid passage between seat ring 94 and shoulder 20 and between seat ring 94 and nozzle ring 96. This pressure equalization across O-ring 100 assists in maintaining O-ring 100 in its desired position even at very high flow rates. As explained, this modified seat assembly provides initial soft seating, then metal-to-metal seating and the flow path of fluids therethrough is defined by the metal members.

The modified form of seat assembly illustrated in FIG. 6 includes the seat ring 78, the nozzle ring 80 and the two O-rings 82 and 84. The seat ring 78 is annular and defines a plurality of passages 86 extending radially therethrough to provide pressure equalization between the interior and the exterior of the seat ring 78. The seat ring 78 also defines the lip 88 extending radially outwardly which is adapted to be engaged by the nozzle ring 80 to clamp the seat ring 78 in position on the shoulder 20 of body 10. The seat ring 78 also defines the upstanding seat 90 on which the projection 44 of sleeve valve 28 is adapted to seat to provide a metal-to-metal seating. O-ring 82 is positioned in a recess defined between the interior of nozzle ring 80 and the exterior of seat ring 78. O-ring 82 extends above seat 90 so that as sleeve valve 28 closes, it first engages O-ring 82 to provide a soft seating and thereafter on further closing movement, it engages seat 90. The passages 86 provide communication from the interior of seat ring 78 to a position behind O-ring 82 so that pressure across O-ring 82 is equalized at all times, preventing a build-up of a pressure differential thereacross which might cause O-ring 82 to be forced out of its position between seat ring 78 and nozzle ring 80. The O-ring 84 is positioned around the exterior of the lip 88 and seals between nozzle ring 80 and shoulder 20 on body 10. As shown, the nozzle ring 80 has an interior contour 92 which coacts with projection 44 to provide the desired flow area for each position of sleeve valve 28.

In operation, the valve of the present invention functions to control the flow from inlet 16 to outlet 18 responsive to the inlet pressure, the force of spring 50 and to the control pressure. Inlet pressure is present in chamber 46 and exerts a force on diaphragm 32 in a direction to open the flow. The force exerted by spring 50 and the force resulting from the control pressure delivered to recess 24 through port 48 exerted on the opposite side of diaphragm 32 both oppose the opening movement. When the inlet pressure force overcomes these opposing forces, sleeve valve 28 moves open to allow flow from inlet 16 to outlet 18. The opening of sleeve valve 28 continues to the position at which the forces on diaphragm 32 are balanced. The inlet pressure is exerted over a smaller area and therefore develops less force as sleeve valve 28 moves in the opening direction because of the support of the outer portion of diaphragm 32 on the supporting surface 56. The amount of flow through the valve is determined by the position of the projection 44 on sleeve valve 28 with respect to the contour 76 on nozzle ring 60. With the relationship illustrated, the flow area available increases very slightly during initial opening but as the sleeve valve approaches its full open position, the flow area increases substantially with respect to small movement of the sleeve valve.

The closing of sleeve valve 28 results initially in projection 44 engaging a soft seat such as resilient ring 66, or O-ring 82, to shut-off flow through the valve. Thereafter closing forces move sleeve valve in a closing direction to compress the soft seat and engage a metal seat, such as seat 70 or 90 to provide a positive metal-to-metal seating and assuring that there is no leakage through the valve.

As previously explained, the diaphragm 32 is substantially fully supported in both extreme positions of sleeve valve 28. This support prevents damage to and failure of diaphragm 32 even when exposed to pressures substantially above its unsupported rupture pressure.

The small clearance area between the exterior of sleeve 34 and the interior of recess 24 provides a dampening of the movement of sleeve valve 28 when there is a sudden surge of pressure. This clearance area conducts control pressure from recess 24 to the top side of diaphragm 32. However, since this flow area is restricted, any sudden surge of pressure either in recess 24 or in chamber 46 is not effective to immediately move the sleeve valve 28 rapidly. A surge of pressure in recess 24 has to flow through this restricted area to be exerted on diaphragm 32. Any sudden change of pressure in chamber 46 is immediately effective on diaphragm 32 but to achieve movement of sleeve valve 28, the control fluid thereabove must flow through this restricted passage. This dampening allows the valve to smoothly respond even to sudden surges of pressure.

The valve of the present invention may be used as a pressure reducing regulator, a back pressure regulator, a flow control valve, a modulating pressure relief valve, and a pop safety valve. These different types of valve functions are provided by the control pressure delivered to the port 48 and the manner in which such control pressure is maintained.

From the foregoing it can be seen that the valve of the present invention is diaphragm actuated and has good stability and smooth operation throughout a wide range of pressures and flows. This valve provides an initial soft seating of the valve member and when additional closing forces are developed, it provides a metal-to-metal seating of the valve member. The diaphragm is supported against extremes of pressure differentials to avoid damage to and failure of the diaphragm. The improved control stability is assisted by the gradually increasing support for the diaphragm as the valve moves open.

What is claimed is:

1. A valve comprising:
   a body defining an inlet, an outlet and a flow passage communicating from the inlet to said outlet,
   a bonnet secured to said body,
   a valve seat surrounding said flow passage,
   a sleeve valve member adapted to move into and from engagement with said valve seat,
   a diaphragm secured to said body and said valve member for moving said valve member responsive to pressures on opposite sides of said diaphragm,
   said bonnet defining a first supporting surface adapted to substantially fully support said diaphragm when said valve member is in full open position,
   a support ring mounted within said body and defining a second supporting surface to fully support said diaphragm when said valve member is in closed position,
   a piston secured within said bonnet and extending within said sleeve valve,
   said sleeve valve having an internal diameter throughout its length which is the same diameter as the internal diameter of said valve seat whereby under all flow conditions, said sleeve valve is free of axial forces exerted by the outlet fluid pressure.

2. A valve comprising:
   a body defining an inlet, an outlet, a flow passage communicating between said inlet and said outlet and a shoulder surrounding said flow passage,
   a bonnet,
   a piston secured within said bonnet and defining an annular space therebetween,
   a sleeve valve adapted to slide in the annular space between said piston and said bonnet,
   an annular diaphragm secured to said body and to said sleeve valve,
   said diaphragm and said body defining a chamber in communication with said inlet whereby one side of said diaphragm is exposed to inlet pressure.
   means for loading the opposite side of said diaphragm, and
   a valve seat positioned on said shoulder of said body,
   said sleeve valve adapted to engage said valve seat,
   said sleeve valve having an internal diameter throughout its length to slide upon said piston and which diameter is the same diameter as the internal diameter of said valve seat whereby under all flow conditions, said sleeve valve is free of axial forces exerted by the outlet fluid pressure, said bonnet defining an annular supporting surface adapted to support substantially all of the free portion of said diaphragm when said valve sleeve is in fully open position.

3. A valve according to claim 2, wherein said supporting surface on said bonnet supports an increasing area of the outer portion of said diaphragm as said sleeve valve moves from closed position toward open position whereby the effective pressure area of said diaphragm decreases and moves inwardly as said sleeve valve moves toward open position.

4. A valve according to claim 2, including a support ring positioned within said body and adapted to support substantially all of the free portion of said diaphragm when said valve sleeve is in closed position.

5. A valve according to claim 2 wherein said sleeve valve is slightly spaced from the interior of said bonnet to define a restricted passage to dampen rapid movements of said sleeve valve.

6. A valve according to claim 2, wherein said valve seat includes:
   a resilient seat, and
   a metal seat,
   said resilient seat positioned with respect to said metal seat and said sleeve valve whereby said sleeve valve on seating initially engages said resilient seat and thereafter compresses said resilient seat to engage said metal seat.

7. A valve comprising:
   a body defining an inlet, an outlet, a shoulder surrounding the flow passage between said inlet and said outlet,
   a bonnet,
   a piston secured within said bonnet and defining an annular space therebetween,
   a sleeve valve adapted to slide in the annular space between said piston and said bonnet,
   an annular diaphragm secured to said body and to said sleeve valve,
   said diaphragm and said body defining a chamber in communication with said inlet whereby one side of said diaphragm is exposed to inlet pressure,
   means for loading the opposite side of said diaphragm,
   a valve seat positioned on said shoulder of said body,
   said sleeve valve adapted to engage said valve seat,
   said bonnet defining an annular supporting surface adapted to support substantially all of the free portion of said diaphragm when said valve sleeve is in full open position,
   a resilient seat,
   a metal seat, said resilient seat positioned with respect to said metal seat and said sleeve valve whereby said sleeve valve on seating initially engages said resilient seat and thereafter compresses said resilient seat to engage said metal seat, and
a nozzle ring secured within said body immediately surrounding said valve seat and defining a contour adapted to coact with said sleeve valve to provide the desired flow area with each position of said sleeve valve,
said nozzle ring engaging said valve seat to clamp said valve seat in position on said shoulder.

8. A valve comprising
a body defining an inlet, an outlet, a shoulder surrounding the flow passage between said inlet and said outlet,
a bonnet,
a piston secured within said bonnet and defining an annular space therebetween,
a sleeve valve adapted to slide in the annular space between said piston and said bonnet,
an annular diaphragm secured to said body and to said sleeve valve,
said diaphragm and said body defining a chamber in communication with said inlet whereby one side of said diaphragm is exposed to inlet pressure,
means for loading the opposite side of said diaphragm,
a valve seat positioned on said shoulder of said body,
said sleeve valve adapted to engage said valve seat,
said bonnet defining an annular supporting surface adapted to support substantially all of the free portion of said diaphragm when said valve sleeve is in full open position,
a metal seat ring having an outer periphery, an inner periphery and two opposed faces, and
a resilient seat ring,
said resilient seat ring being channel-shaped and secured to the outer periphery and the two opposed faces of said metal seat ring whereby said valve seat is reversible.

9. A valve comprising
a body defining an inlet, an outlet, a shoulder surrounding the flow passage between said inlet and said outlet,
a bonnet,
a piston secured within said bonnet and defining an annular space therebetween,
a sleeve valve adapted to slide in the annular space between said piston and said bonnet,
an annular diaphragm secured to said body and to said sleeve valve,
said diaphragm and said body defining a chamber in communication with said inlet whereby one side of said diaphragm is exposed to inlet pressure,
means for loading the opposite side of said diaphragm,
a valve seat positioned on said shoulder of said body,
said sleeve valve adapted to engage said valve seat,
said bonnet defining an annular supporting surface adapted to support substantially all of the free portion of said diaphragm when said valve sleeve is in full open position,
a resilient seat, and
a metal seat,
said resilient seat positioned with respect to said metal seat and said sleeve valve whereby said sleeve valve on seating initially engages said resilient seat and thereafter compresses said resilient seat to engage said metal seat,
said metal defines a seating surface and a recess adapted to receive said resilient seat surrounding said seating surface and a plurality of passages communicating from the interior of said metal seat to the exterior of said recess to equalize pressure across said resilient seat.

10. A valve comprising
a body defining an inlet, an outlet, a shoulder surrounding the flow passage between said inlet and said outlet,
a bonnet,
a piston secured within said bonnet and defining an annular space therebetween,
a sleeve valve adapted to slide in the annular space between said piston and said bonnet,
an annular diaphragm secured to said body and to said sleeve valve,
said diaphragm and said body defining a chamber in communication with said inlet whereby one side of said diaphragm is exposed to inlet pressure,
means for loading the opposite side of said diaphragm,
a valve seat positioned on said shoulder of said body,
said sleeve valve adapted to engage said valve seat,
said bonnet defining an annular supporting surface adapted to support substantially all of the free portion of said diaphragm when said valve sleeve is in full open position,
a resilient seat,
a metal seat,
said resilient seat positioned with respect to said metal seat and said sleeve valve whereby said sleeve valve on seating initially engages said resilient seat and thereafter compresses said resilient seat to engage said metal seat,
said metal seat defines a seating surface and a recess adapted to receive said resilient seat surrounding said seating surface, and
means retaining said metal seat in close spaced relationship to said shoulder whereby said metal seat may float off said shoulder when not engaged by said sleeve valve to define a passage to equalize pressure across said resilient seat.

References Cited

UNITED STATES PATENTS

| | | | |
|---|---|---|---|
| 1,314,977 | 9/1919 | Neal | 137—510 XR |
| 1,860,450 | 5/1932 | Campbell | 137—510 |
| 2,485,092 | 10/1949 | Gannon | 251—332 |
| 2,748,797 | 6/1956 | Heizer | 92—98 XR |
| 2,994,340 | 8/1961 | Biello | 137—516.29 |
| 3,078,066 | 2/1963 | Moore | 137—510 XR |
| 3,389,796 | 6/1968 | Fiala | 251—282 XR |

HAROLD W. WEAKLEY, Primary Examiner

U.S. Cl. X.R.

137—510, 516.29; 251—282, 332